United States Patent
Krapf

(10) Patent No.: US 9,706,125 B2
(45) Date of Patent: Jul. 11, 2017

(54) IMAGE CAPTURING DEVICE

(75) Inventor: Reiner Krapf, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 213 days.

(21) Appl. No.: 14/237,708

(22) PCT Filed: Jun. 20, 2012

(86) PCT No.: PCT/EP2012/061804
§ 371 (c)(1),
(2), (4) Date: May 21, 2014

(87) PCT Pub. No.: WO2013/020747
PCT Pub. Date: Feb. 14, 2013

(65) Prior Publication Data
US 2014/0340540 A1    Nov. 20, 2014

(30) Foreign Application Priority Data
Aug. 8, 2011 (DE) .......................... 10 2011 080 582

(51) Int. Cl.
*H04N 5/228* (2006.01)
*H04N 5/232* (2006.01)

(52) U.S. Cl.
CPC ..... *H04N 5/23293* (2013.01); *H04N 5/23212* (2013.01)

(58) Field of Classification Search
None
See application file for complete search history.

(56) References Cited

U.S. PATENT DOCUMENTS 5,724,579 A * 3/1998 Suzuki ............... G06F 17/3028
5,808,678 A     9/1998 Sakaegi
6,466,701 B1   10/2002 Ejiri et al.
(Continued)

FOREIGN PATENT DOCUMENTS

DE    10 2004 049 872 A1   4/2006
EP        1 638 048 A1      3/2006

OTHER PUBLICATIONS

International Search Report corresponding to PCT Application No. PCT/EP2012/061804, mailed Sep. 5, 2012 (German and English language document) (7 pages).

*Primary Examiner* — Twyler Haskins
*Assistant Examiner* — Wesley Chiu
(74) *Attorney, Agent, or Firm* — Maginot, Moore & Beck LLP

(57) ABSTRACT

An image capturing device includes an optical module configured to capture an image, at least one sensor module configured to generate image signals for the captured image, and a data processing module configured to generate image data for the captured image on the basis of the generated image signals. The image capturing device further includes a display device configured to display the captured image on the basis of the generated image data and an assigned memory unit configured to store the generated image data. The data processing module has a marking unit configured to optically mark at least one image position in the displayed image on the display device and to produce on the display device a display of at least one designating element to allow a designation of the at least one image position. The designating element is configured to allow a clear identification of the image position designated.

10 Claims, 3 Drawing Sheets

(56) References Cited

U.S. PATENT DOCUMENTS

| | | | |
|---|---|---|---|
| 7,493,559 B1* | 2/2009 | Wolff | G06F 17/241 |
| | | | 715/727 |
| 2003/0160886 A1* | 8/2003 | Misawa | H04N 5/2253 |
| | | | 348/347 |
| 2005/0001909 A1* | 1/2005 | Okisu | H04N 1/32101 |
| | | | 348/231.5 |
| 2005/0168594 A1 | 8/2005 | Larson | |
| 2005/0191036 A1* | 9/2005 | Okutani | H04N 9/8063 |
| | | | 386/230 |
| 2008/0089556 A1 | 4/2008 | Salgian et al. | |
| 2009/0251557 A1* | 10/2009 | Kim | H04N 5/23219 |
| | | | 348/222.1 |
| 2009/0268047 A1 | 10/2009 | Sogoh et al. | |
| 2009/0290019 A1 | 11/2009 | McNelis et al. | |
| 2009/0324022 A1* | 12/2009 | Sangberg | G06F 17/30265 |
| | | | 382/118 |
| 2010/0002096 A1* | 1/2010 | Hong | G11B 27/3027 |
| | | | 348/231.3 |
| 2010/0085446 A1* | 4/2010 | Thorn | G06F 3/011 |
| | | | 348/239 |
| 2010/0125812 A1 | 5/2010 | Hartman et al. | |
| 2011/0039598 A1* | 2/2011 | Tang | H04N 5/772 |
| | | | 455/556.1 |

* cited by examiner

IMAGE CAPTURING DEVICE

This application is a 35 U.S.C. §371 National Stage Application of PCT/EP2012/061804, filed on Jun. 20, 2012, which claims the benefit of priority to Serial No. DE 10 2011 080 582.6, filed on Aug. 8, 2011 in Germany, the disclosures of which are incorporated herein by reference in their entirety.

BACKGROUND

The present disclosure relates to an image capturing device having an optical module for capturing an image, at least one sensor module for generating image signals for the captured image, a data processing module for generating image data for the captured image on the basis of the generated image signals, a display device for displaying the captured image on the basis of the generated image data, and an assigned memory unit for storing the generated image data, wherein the data processing module has a marking unit for optically marking at least one image position in the displayed image on the display device.

Such image capturing devices, which are configured for example as digital cameras and, for focusing on selectable image regions of an image captured via an assigned optical module, enable optical marking of said image regions, are known from the prior art. Here, a respectively selected region is optically marked for example by a rectangle enclosing said region, and the assigned optical module is actuated to set the focus of the captured image to this selected region.

One disadvantage of the prior art is that such optical marking is available only up to a corresponding triggering of the digital camera, and is subsequently discarded. As a result, by way of example a further image captured subsequently for the selected region, for example an enlarged detail view, may not be able to be assigned to the selected region of the previously captured image, which illustrates for example an overview image.

SUMMARY

It is therefore an object of the disclosure to provide a novel image capturing device which enables linking a region selected in a captured image with a further image which is captured subsequently for this selected region.

This problem is solved by way of an image capturing device having an optical module for capturing an image, at least one sensor module for generating image signals for the captured image, a data processing module for generating image data for the captured image on the basis of the generated image signals, a display device for displaying the captured image on the basis of the generated image data, and an assigned memory unit for storing the generated image data. The data processing module has a marking unit for optically marking at least one image position in the displayed image on the display device. The marking unit is designed to effect a display of at least one designating element on the display device so as to allow designation of the at least one image position. The designating element is designed to allow unique identification of the designated image position.

The disclosure thus allows the provision of an image capturing device, in which unique, permanent designation of a selectable image position in a captured image is generatable in order to allow linking of said captured image with at least one further captured image by way of said unique designation.

The data processing module is preferably designed to assign, upon capturing a further image within the region of the designated image position, the designation element to the further image.

Thus two different images, between which there is a relationship, can be certainly and reliably linked with one another.

The captured image preferably represents an overview image, and the further image represents a detail image of a section of the overview image.

It is thus possible in a simple manner to capture two different images between which a relationship exists.

According to one embodiment, the data processing module is designed to store at least the at least one designation element in association with the generated image data for the captured image and further image data for the further image in the assigned memory unit so as to link the further image with the captured image.

The disclosure thus allows uncomplicated and efficient referencing of the further image data generated for the further image by way of the image data generated for the captured image.

The data processing module is preferably designed to store meta data in the assigned memory unit so as to link the further image with the captured image.

It is thus possible to certainly and reliably link two different images with one another via suitable meta data.

According to one embodiment, the data processing module has a data-processing element, which is designed to actuate the marking unit on the basis of predetermined criteria, wherein the predetermined criteria are based on image parameters which are assigned to the generated image data.

The disclosure thus allows the provision of an image capturing device, in which the marking unit is actuable in a simple manner.

The data-processing element is preferably designed to determine the image parameters by way of pattern recognition.

It is thus possible to automatically determine the image parameters necessary for actuating the marking unit.

According to one embodiment, the marking unit is designed to allow at least one marking element for marking the at least one image position to be displayed on the display device, wherein the marking element is configured in the manner of crosshairs or a marking point.

The disclosure thus allows the provision of an image capturing device, in which display of an uncomplicated and highly visible marking element is made possible.

Preferably, an input device is provided for moving the marking element on the display device.

The marking element can thus be moved certainly and quickly on the display device.

Preferably, at least one operating element is provided for switching from a marking mode into an image capturing mode.

It is thus possible in a simple manner to switch between the marking mode and the image capturing mode.

According to one embodiment, the image capturing device is configured in the manner of a digital camera or a thermal imaging camera.

The problem mentioned in the introduction is also solved by a method for operating an image capturing device having an optical module for capturing an image, at least one sensor module for generating image signals for the captured image, a data processing module for generating image data for the captured image on the basis of the generated image signals, a display device for displaying the captured image on the basis of the generated image data, and an assigned memory unit for storing the generated image data. At least one image position is optically marked in the displayed image on the display device, and at least one designation element is displayed for designating the at least one image position, which designation element allows unique identification of the designated image position. Upon capturing a further image within the region of the designated image position, the designation element is assigned to the further image in order to effect a link of the further image with the captured image.

BRIEF DESCRIPTION OF THE DRAWINGS

The disclosure will be explained in more detail in the following description with reference to exemplary embodiments illustrated in the drawings, in which.

DETAILED DESCRIPTION

Figure 1:
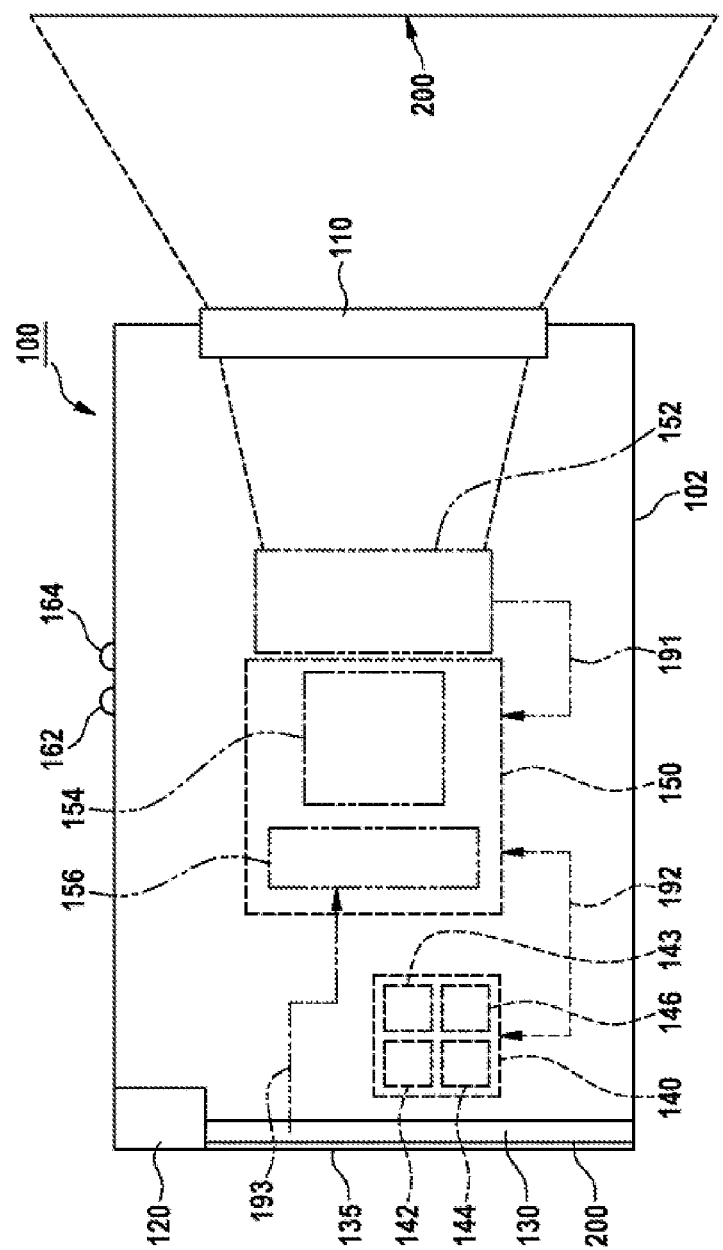
FIG. 1 shows a schematic block diagram of an image capturing device according to one embodiment.

FIG. 1 shows an exemplary image capturing device 100, which is designed according to one embodiment in the manner of a digital camera or a thermal imaging camera. Said image capturing device 100 has, illustratively, a housing 102, on which or in which at least one optical module 110, at least one sensor module 152, at least one data processing module 150, at least one assigned memory unit 140, at least one display device 130, and at least one, and illustratively two operating elements 162, 164, and an input device 135 are provided. In addition, optionally at least one viewfinder 120 may be provided on the or in the housing 102.

The optical module 110 serves for capturing an image 200. To this end, the optical module 110 can comprise an objective having one or more lenses, through which the image 200 for capturing can be projected onto the sensor module 152. The objective can allow both a manual and automatic setting of sharpness and/or focal length.

To fix the image 200 to be captured, the optional viewfinder 120 can be used. For this purpose, the latter can have a separate optical unit. In addition, it is also possible for the display device 130 to serve for fixing the image 200 to be captured.

The sensor module 152 serves for generating image signals for the captured image 200. To this end, the sensor module 152 can have one or more assigned CCD (charge-coupled device) image chips, for example CCD image chips having a resolution of less than 5 megapixels, if the image capturing device 100 is designed in the manner of a digital camera, or of less than 64×64 pixels, if the image capturing device 100 is designed in the manner of a thermal imaging camera. Alternatively, it is also possible for this purpose to use other suitable sensor modules or image chips.

The data processing module 150 serves for generating image data 142 for the captured image 200 on the basis of the generated image signals, which are supplied from the sensor module 152 to the data processing module 150, as indicated by arrow 191. The generated image data 142 are designed to allow display of the captured image 200 on the display device 130 and can be stored in the assigned memory unit 140, as indicated by arrow 192. In addition, further image data 143, 144 and/or meta data 146 can be stored in the memory unit 140, as described below in FIGS. 2 to 4. Furthermore, the image data 142, 143, 144 and/or meta data 146 stored in the memory unit 140 can also be retrieved therefrom, for example in order to display them on the display device 130 at any desired time or to transmit them to an external data processing device, for example a computer, a laptop or a PDA, as is likewise indicated by arrow 192.

The data processing module 150 illustratively has a data processing element 154 and a marking unit 156 and is designed for example in the manner of a microcontroller. The marking unit 156 serves for optically marking at least one image position (225, 235 in FIG. 2) in the displayed image 200 on the display device 130. Here, the marking unit 156 is preferably designed to allow at least one marking element (222, 232 in FIG. 2) for marking the at least one image position (225, 235 in FIG. 2) to be displayed on the display device 130, wherein the marking element (222, 232 in FIG. 2) is configured for example in the manner of crosshairs or a marking point. In addition, the marking unit 156 is designed to effect a display of at least one designation element (224, 234 in FIG. 2) on the display device 130 so as to allow designation of the at least one image position (225, 235 in FIG. 2). This designation element (224, 234 in FIG. 2) is designed to allow unique identification of the designated image position (225, 235 in FIG. 2).

The data processing element 154 is preferably designed to actuate the marking unit 156 on the basis of predetermined criteria. Said predetermined criteria can be based, for example, on image parameters which are assigned to the generated image data 142, wherein the image parameters are determinable for example by way of pattern recognition. Suitable pattern recognition methods are sufficiently known to the person skilled in the art, such that for purposes of a concise description here, a detailed description of such methods can be omitted. In addition, the image parameters can be ascertained for example by automatically determining corresponding image positions with specific properties which designate for example damaged locations or locations with unexpected or excessive heat losses.

The input device 135 serves for moving the marking element (222, 232 in FIG. 2) on the display device 130. To this end, the input device 135 can actuate for example the data processing module 150 or the marking unit 156, as indicated by arrow 193. The input device 135, together with the display device 138, illustratively forms a touch-sensitive screen, which is referred to as a touch screen. It must be noted, however, that the description of a touch screen is merely of exemplary character and must not be understood as a limitation of the disclosure. Instead, the disclosure can also be implemented with additional and/or alternative input devices, such as for example cursor keys, rolling wheels, joysticks and/or touch-sensitive control pads, which are referred to as touch pads.

The operating elements 162, 164 are configured illustratively as pushbuttons and serve by way of example for switching from a marking mode into an image capturing mode. The image capturing device 100 is switchable into an assigned image capturing mode for example by operating the pushbutton 162 and into an assigned marking mode by operating the pushbutton 164. It should be noted, however, that the description of both operating elements 162, 164 and their realization as pushbuttons is merely of exemplary character and must not be understood as a limitation of the disclosure. Rather, it is also possible to use a single switch for switching between the marking mode and the image capturing mode or to switch using the input device 135. In addition, the marking mode can also be terminated for example by way of switching off the image capturing device 100.

The method of function of the image capturing device 100 will be described by way of example below with reference to FIGS. 2 to 4.

Figure 2:
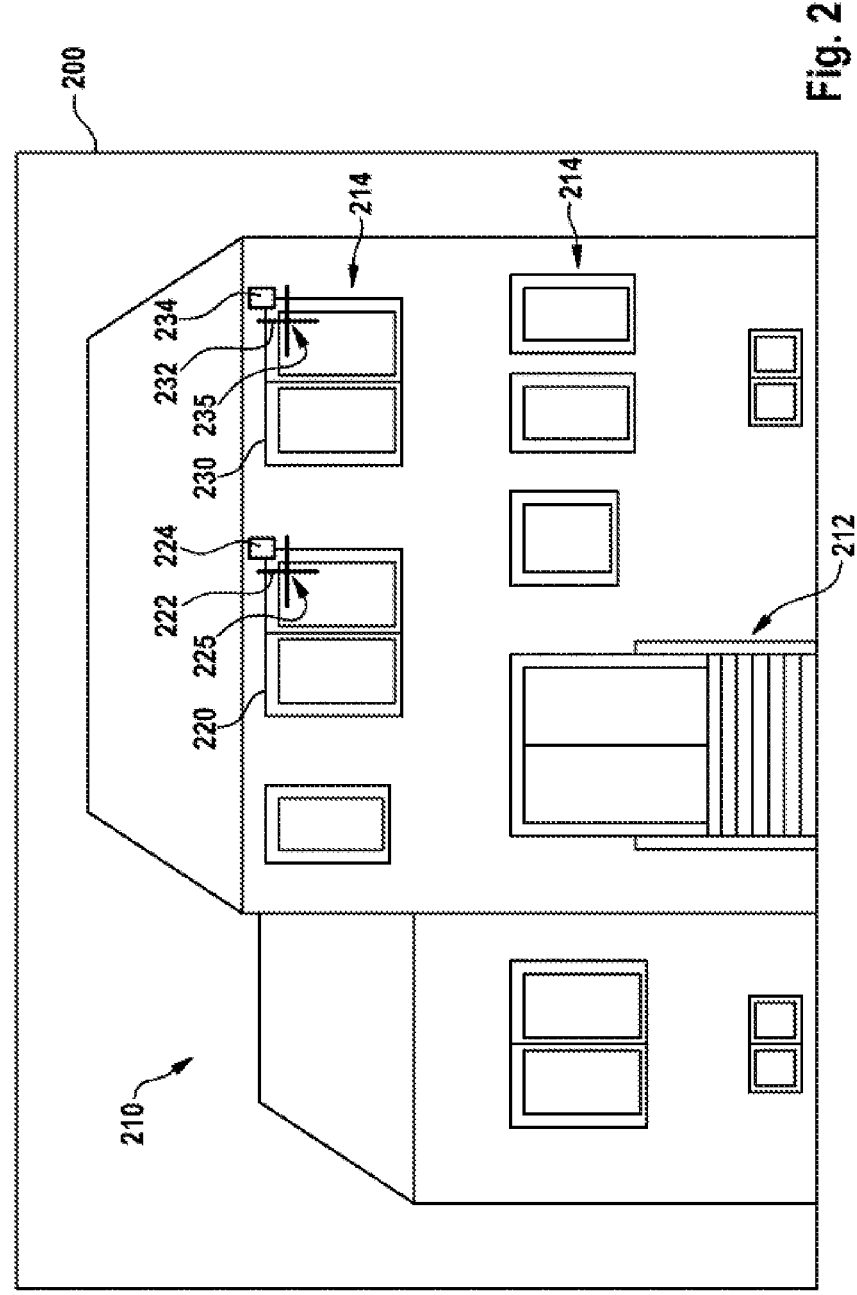
FIG. 2 shows a schematic view of an overview image captured with the image capturing device of FIG. 1.

FIG. 2 shows the image 200 showing by way of example a top view of a house facade 210, which image 200 is captured with the image capturing device 100 of FIG. 1 in the image capturing mode and is displayed on the display device 130 thereof. The displayed image 200 thus represents an overview image of the house facade 210, which illustratively has an entry region 212 and a multiplicity of windows 214, of which by way of example only two windows are designated with the reference signs 220 and 230.

According to one embodiment, a user of the image capturing device 100 can now change to the marking mode of the image capturing device 100, for example by operating the pushbutton 164 of FIG. 1, so as to mark one or more selected image positions in the overview image 200. Using the input device 135, for example, the user illustratively marks two image positions 225, 235 on the windows 220 and 230, respectively, with assigned marking elements 222 and 232, respectively.

Figure 3:
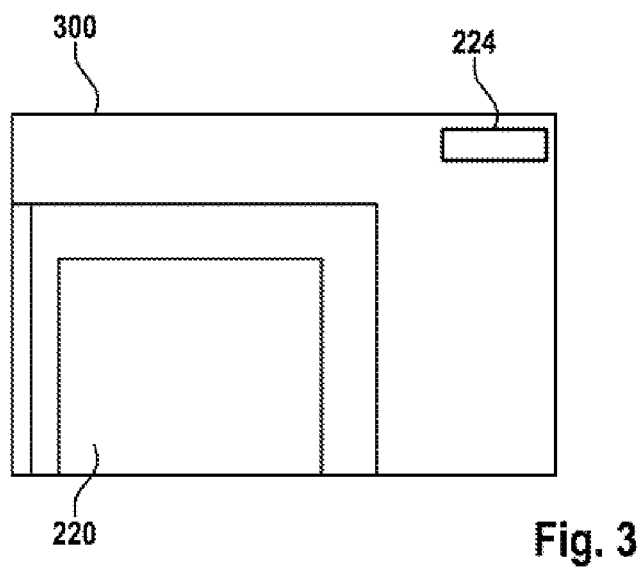
FIG. 3 shows a schematic view of a first detail image captured with the image capturing device of FIG. 1 in relation to the overview image of FIG. 2.
Figure 4:
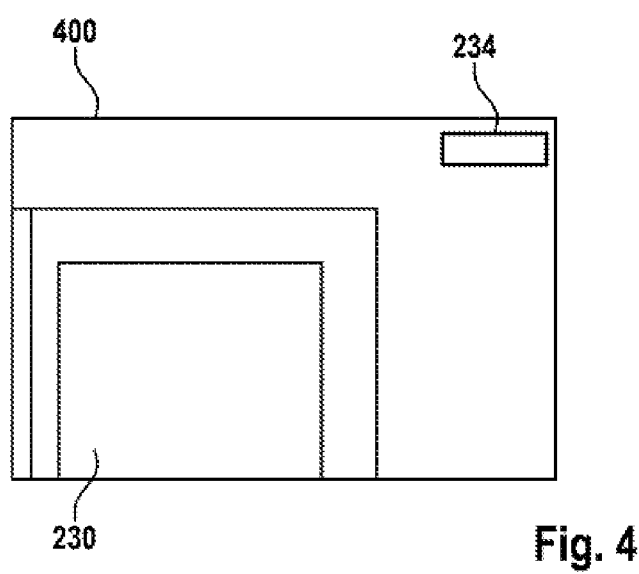
FIG. 4 shows a schematic view of a second detail image captured with the image capturing device of FIG. 1 in relation to the overview image of FIG. 2.

If the image capturing device 100 is configured in the manner of a digital camera, the user can mark the image positions 225, 235 to be able to document, for example, damage to the windows 220, 230 in enlarged detail views or images (300 in FIGS. 3 and 400 in FIG. 4). If the image capturing device 100 is configured in the manner of a thermal imaging camera, the user can mark the image positions 225, 235, for example to be able to document heat losses at the windows 220, 230 in enlarged detail views or images (300 in FIGS. 3 and 400 in FIG. 4). Alternatively, to this end, the image positions 225, 235, as described in FIG. 1, can be ascertained by the data processing element 154 using a suitable pattern recognition and be marked automatically.

According to one embodiment, each marking element 222, 232 in the overview image 200 is assigned a unique designation element 224 and 234, respectively. The designation element 224, which is assigned to the marking element 222 set first by way of example, can be formed by the number "1" or the letter "A", and the designation element 234, which is assigned to the marking element 232 set second by way of example, can be formed by the number "2" or the letter "B." It is noteworthy, however, that these numbers and letters are merely of exemplary character and should not be understood as a limitation of the disclosure. Rather, the designation elements 224, 234 can have any configuration, as long as they are designed, as described in FIG. 1, to allow unique identification of the respective image position 225, 235.

The marking elements 222, 232 and the assigned designation elements 224 and 234, respectively, are inserted into the image data 142 of FIG. 1 generated for the overview image 200 by the data processing module 150 of FIG. 1, or at least stored in the memory unit 140 of FIG. 1 in association therewith. It is thus possible, if necessary, to access these marking elements 222, 232 and the assigned designation elements 224 and 234 at any time.

After marking the image positions 225, 235, the user can switch into the image capturing mode of the image capturing device 100 for example by operating the pushbutton 162 of FIG. 1 in order to capture a further image or a first detail image (300 in FIG. 3) within the region of the marked and designated image position 225 and a further image or a second detail image (400 in FIG. 4) within the region of the marked and designated image position 235. It is noteworthy, however, that the description of the marking and designation of the image positions 225, 235 in the overview image 200 and subsequent capturing of the first and second detail images (300 in FIGS. 3 and 400 in FIG. 4) are merely of exemplary character and should not be understood as limiting the disclosure. Rather, it is possible to capture initially an assigned detail image even after each marking of a selected image position in a corresponding overview image, before a further marking is inserted or can be inserted into the overview image. In addition, it is also possible initially to capture one or more detail images and to subsequently generate corresponding image positions in an assigned overview image. Furthermore, it is also possible for various operating elements to be provided to allow for example switching from an overview image mode into a detail image mode etc.

According to one embodiment, each of the marking elements 222, 232 designates roughly the center of a subsequently recorded detail image. Alternatively, further variants are also for this purpose realizable, for example it is possible for each of the marking elements 222, 232 to designate in each case the upper right-hand corner or lower left-hand corner of a subsequently recorded detail image etc.

FIG. 3 shows an exemplary further image 300, which was captured illustratively with the image capturing device 100 of FIG. 1 within the region of the designated image position 225 of the house facade 210 of FIG. 2 and represents a detail image recorded for this image position of a detail of the overview image 200 of FIG. 2. Since, as described in FIG. 2, the marking element 222 of FIG. 2 fixes roughly the center of the detail image 300, the window 220 in FIG. 3 is visible only sectionally.

According to one embodiment, the data processing module 150 of FIG. 1 assigns, upon capturing of the detail image 300, the designation element 224, which is assigned to the image position 225 in FIG. 2, to said detail image 300 because the detail image 300 was captured for example as the first one after the overview image 200 of FIG. 2. To this end, the data processing module 150 generates image data for the detail image 300, for example the image data 143 of FIG. 1, into which the designation element 224 is inserted or which are stored therewith in the memory unit 140 of FIG. 1, so as to link the detail image 300 and the overview image 200 of FIG. 2 with one another.

Alternatively or additionally, the data processing module 150 to this end, as described in FIG. 1, can generate meta data for linking the detail image 300 with the overview image 200 of FIG. 2, for example the meta data 146 of FIG. 1, and store them in the memory unit 140 of FIG. 1. Such meta data permit for example linking of a file name, recording data, etc. assigned to the detail image 300 or of any index assigned thereto with the image position 225 in the overview image 200 of FIG. 2. According to one embodiment, the meta data are generated in association with what is referred to as an EXIF file, or are stored in this data format in the memory unit 140 of FIG. 1.

FIG. 4 shows an exemplary further image 400, which was captured illustratively with the image capturing device 100 of FIG. 1 within the region of the designated image position 235 of the house facade 210 of FIG. 2 and represents a detail image recorded for this image position of a detail of the overview image 200 of FIG. 2. Since, as described in FIG. 2, the marking element 235 of FIG. 2 fixes roughly the center of the detail image 400, the window 230 in FIG. 4 is visible only sectionally.

According to one embodiment, the data processing module 150 of FIG. 1 assigns, upon capturing of the detail image 400, the designation element 234, which is assigned to the image position 235 in FIG. 2, to said detail image 400 because the detail image 400 was captured for example as the second one after the overview image 200 of FIG. 2. To this end, the data processing module 150 generates image data for the detail image 400, for example the image data 144 of FIG. 1, into which the designation element 234 is inserted or which are stored therewith in the memory unit 140 of FIG. 1, so as to link the detail image 400 and the overview image 200 of FIG. 2 with one another. Alternatively or additionally, the data processing module 150, as described in FIGS. 1 and 3, can generate meta data for linking the detail image 400 with the overview image 200 of FIG. 2, for example the meta data 146 of FIG. 1, and store them in the memory unit 140 of FIG. 1.

It is noteworthy that the detail image 400 and the detail image 300 of FIG. 3 illustratively differ merely by the designation elements 234 and 224 of FIG. 3. Without these designation elements, it would therefore not be possible to differentiate between these detail images and uniquely assigned them to the image positions 235 and 225, respectively, of FIG. 2. In addition, it should be noted that the present disclosure, as described in FIG. 1, can be used preferably in digital cameras or thermal imaging cameras which have CCD image chips with a resolution of less than 5 megapixels for a digital camera, or less than 64×64 pixels for a thermal imaging camera. In these cases, only blurred and thus unusable detail images would be obtained during customary zooming in on selected image positions of the overview image 200 of FIG. 2, such that a separate recording of detail images according to the disclosure is necessary. However, the present disclosure can also be used for cameras with greater resolutions.

Furthermore, the present disclosure is also not limited to use in digital cameras and thermal imaging cameras, but can be used in a multiplicity of different image capturing devices, for example in microscopes. In addition, the image capturing device of the present disclosure can also be used in a number of other, different applications, for example in material examinations for detecting or documenting cracks etc.

The invention claimed is:

1. An image capturing device, comprising:
an optical module configured to capture an image;
at least one sensor module configured to generate image signals for the captured image;
a data processing module configured to generate image data for the captured image on the basis of the generated image signals;
a display device configured to display the captured image on the basis of the generated image data; and
an assigned memory unit configured to store the generated image data,
wherein the data processing module has a marking unit configured to optically mark at least one image position in the displayed image on the display device with an optical mark,
wherein the marking unit is configured to effect a display of at least one designation element on the display device so as to allow designation of the at least one image position,
wherein the display device is further configured to display the at least one designation element differently from the display of the optical mark on the display device, and to display the at least one designation element spaced apart from the display of the optical mark,
wherein the data processing module is further configured to insert data corresponding to the at least one designation element into the generated image data of the captured image,
wherein the at least one designation element is configured to identify uniquely the designated image position in the captured image,
wherein in response to capturing a further image including image data corresponding to the designated image position, the data processing module is further configured to insert automatically data corresponding to the at least one designation element into the image data of the further image, such that the at least one designation element is displayed on the display device automatically when the further image is displayed on the display device, and
wherein the at least one designation element uniquely identifies the designated image position in the further image.

2. The image capturing device as claimed in claim 1, wherein the captured image represents an overview image, and the further image represents a detail image of a section of the overview image that includes the designated image position.

3. The image capturing device as claimed in claim 1, wherein the data processing module is configured to store meta data in the assigned memory unit so as to link the further image with the captured image.

4. The image capturing device as claimed in claim 1, wherein the data processing module has a data processing element configured to actuate the marking unit on the basis of predetermined criteria, and wherein the predetermined criteria are based on image parameters assigned to the generated image data.

5. The image capturing device as claimed in claim 4, wherein the data processing element is configured to determine the image parameters by way of pattern recognition.

6. The image capturing device as claimed in claim 1, wherein the marking unit is configured to allow at least one marking element configured to mark the at least one image position to be displayed on the display device, and wherein the marking element is configured in the manner of crosshairs or a marking point.

7. The image capturing device as claimed in claim 6, further comprising an input device configured to move the marking element on the display device.

8. The image capturing device as claimed in claim 1, further comprising at least one operating element configured to switch from a marking mode into an image capturing mode.

9. The image capturing device as claimed in claim 1, wherein the image capturing device is configured in the manner of a thermal imaging camera.

10. A method for operating an image capturing device including an optical module for capturing an image, at least one sensor module for generating image signals for the captured image, a data processing module for generating image data for the captured image on the basis of the generated image signals, a display device for displaying the captured image on the basis of the generated image data, and an assigned memory unit for storing the generated image data, the method comprising:

optically marking at least one image position in the displayed image on the display device with an optical mark;

displaying at least one designation element configured to designate the at least one image position, the designation element uniquely identifying the designated image position;

displaying the designation element on the display device differently and spaced apart from the optical mark;

upon capturing a further image, use pattern recognition to determine if the further image includes image data corresponding to the designated image position;

if the further image includes image data corresponding to the designated image position, automatically inserting into the image data of the further image, data corresponding to the at least one designation element with the data processing module, so as to effect a link of the further image with the captured image and to identify uniquely the designated image position in the further image; and automatically displaying the at least one designation element on the display device when the further image is displayed on the display device.

* * * * *